United States Patent
Kubota et al.

(10) Patent No.: US 8,071,257 B2
(45) Date of Patent: Dec. 6, 2011

(54) FUEL CARTRIDGE AND FUEL CELL

(75) Inventors: Makoto Kubota, Tokyo (JP); Motokazu Kobayashi, Yokohama (JP); Keiko Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/279,782

(22) PCT Filed: Dec. 15, 2006

(86) PCT No.: PCT/JP2006/325577
§ 371 (c)(1),
(2), (4) Date: Aug. 18, 2008

(87) PCT Pub. No.: WO2007/122778
PCT Pub. Date: Nov. 1, 2007

(65) Prior Publication Data
US 2010/0028751 A1 Feb. 4, 2010

(30) Foreign Application Priority Data
Apr. 25, 2006 (JP) ................................. 2006-120804

(51) Int. Cl.
H01M 2/38 (2006.01)
H01M 8/04 (2006.01)
(52) U.S. Cl. ......... 429/512; 429/462; 429/513; 429/515
(58) Field of Classification Search ........................ None
See application file for complete search history.

(56) References Cited

U.S. PATENT DOCUMENTS

| 6,828,049 | B2 | 12/2004 | Bullock et al. | |
| 6,887,596 | B2 * | 5/2005 | Leban | 429/9 |
| 7,306,863 | B2 | 12/2007 | Bullock et al. | |
| 2002/0172853 | A1 * | 11/2002 | Kamo et al. | 429/34 |
| 2004/0224199 | A1 | 11/2004 | Ninomiya et al. | |
| 2005/0118468 | A1 | 6/2005 | Adams et al. | |

FOREIGN PATENT DOCUMENTS

| EP | 1 306 918 A2 | 5/2003 |
| EP | 1 455 403 A2 | 9/2004 |
| JP | 2004-71262 A | 3/2004 |
| JP | 2005-158298 A | 6/2005 |

* cited by examiner

Primary Examiner — Barbara Gilliam
Assistant Examiner — Adam A Arciero
(74) Attorney, Agent, or Firm — Fitzpatrick, Cella, Harper & Scinto

(57) ABSTRACT

A fuel cell including a fuel cartridge with a fuel storage portion and a fuel feed opening and a fuel cell body with an output terminal and a power generation portion. The fuel cell comprises a wiring portion for electrically connecting the output terminal and power generation portion of the fuel cell body with each other when the fuel cartridge is mounted to the fuel cell body to place a fuel in a state in which the fuel is feedable from the fuel cartridge to the fuel cell body and for electrically disconnecting the output terminal and power generation portion of the fuel cell body when the fuel cartridge is removed from the fuel cell body.

9 Claims, 5 Drawing Sheets

_US 8,071,257 B2_

FUEL CARTRIDGE AND FUEL CELL

TECHNICAL FIELD

The present invention relates to a fuel cartridge and a fuel cell. Particularly, the present invention relates to a fuel cartridge for energizing a circuit by mounting it in a fuel cell body.

BACKGROUND ART

When the fuel flow in a fuel cell that is electrically connected to electronic equipment is stopped, electric power gradually decreases to a point at which power generation stops. In this manner, the electric power decreases below a threshold necessary to drive the electronic equipment at a certain time. As a result, some of the electric power that is generated by the cell is wasted.

In view of such a problem, Japanese Laid-Open Patent Application (JP-A) 2005-158298 discloses a method for operating a fuel cell power generating system in which an external circuit is interrupted together with the stoppage of the fuel gas flow. However, this operating method requires an operation control means for simultaneously stopping the flow of the fuel gas and interrupting the external circuit.

JP-A 2004-71262 discloses a fuel cell device in which the actuation control is effected on the basis of a result of mounting recognition during the mounting of a fuel cartridge, which is provided with a memory, to the fuel cell device. However, this fuel cell device requires a control portion for effecting the control based on the recognition of the mounting of the fuel cartridge to the fuel cell device.

As described above, when the method of JP-A 2005-158298 and the device of JP-A 2004-71262 are put into practical use, it is necessary to employ a control circuit to detect a complicated electric signal and to control fuel flow and external circuit interruption based on the detection. Accordingly, it is difficult to reduce both the size and the cost of the fuel cell.

DISCLOSURE OF THE INVENTION

An object of the present invention is to provide a fuel cell and fuel cartridge that are capable of synchronizing mounting and demounting of the fuel cartridge with a transition between a supply state and supply-interrupting state of the current produced by electric power generation using an electric circuit having a simple constitution.

According to an aspect of the present invention, there is provided a fuel cartridge comprising a fuel storage portion and a fuel feed opening, wherein the fuel cartridge comprises a wiring portion constituting a part of wiring for electrically connecting an output terminal of a fuel cell body and a power generation portion of a fuel cell body with each other when the fuel cartridge is mounted to the fuel cell body to place a fuel in a state in which the fuel is feedable from the fuel cartridge to the fuel cell body.

At least a part of the wiring portion may preferably be exposed at a first portion of a surface of the fuel cartridge, and the surface of the fuel cartridge may preferably be electrically insulative at a second portion thereof other than the first portion.

The fuel cartridge may preferably further comprise a fuel feeding mechanism driven by electric power supplied through the wiring portion.

Further, the fuel cartridge may preferably comprise a valve that is opened when the fuel cartridge is mounted in the fuel cell body and closed when the fuel cartridge is removed from the fuel cell body.

According to another aspect of the present invention, there is provided a fuel cell comprising a fuel cartridge, which comprises a fuel storage portion and a fuel feed opening, and a fuel cell body, which comprises an output terminal and a power generation portion. The fuel cell comprises a wiring portion for electrically connecting the output terminal and the power generation portion of the fuel cell body with each other when the fuel cartridge is mounted to the fuel cell body to place a fuel in a state in which the fuel is feedable from the fuel cartridge to the fuel cell body and for electrically disconnecting the output terminal and the power generation portion of the fuel cell body when the fuel cartridge is removed from the fuel cell body. The wiring portion may preferably be provided to the fuel cartridge or the fuel cell body. The fuel cartridge may preferably be a polymer electrolyte fuel cell.

These and other objects, features, and advantages of the present invention will become more apparent upon a consideration of the following description of the preferred embodiments of the present invention taken in conjunction with the accompanying drawings.

BEST MODE FOR CARRYING OUT THE INVENTION

Hereinbelow, embodiments of the fuel cell according to the present invention will be described with reference to the drawings using a polymer electrolyte fuel cell (solid polymer-type fuel cell) as an example. However, the fuel cell of the present invention is not limited thereto.

Embodiment 1

Figure 1:
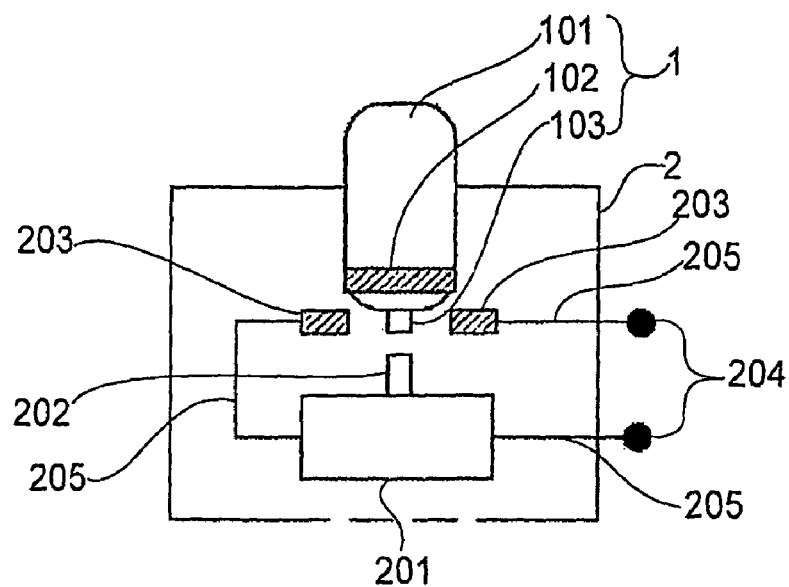
FIG. 1 is a schematic view showing an unmounted state of a fuel cartridge to a fuel cell body in Embodiment 1 of the present invention.
Figure 2:
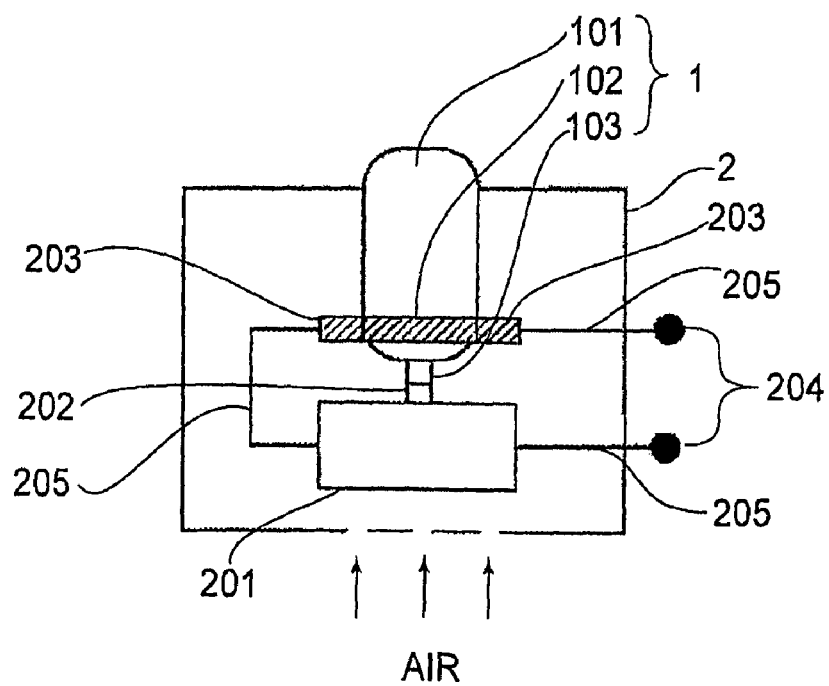
FIG. 2 is a schematic view showing a mounted state of a fuel cartridge to a fuel cell body in Embodiment 1 of the present invention.

FIGS. 1 and 2 are schematic views showing an unmounted state and a mounted state, respectively, of a fuel cartridge in or to a fuel cell body in Embodiment 1 of the present invention.

A fuel cartridge 1 includes at least a fuel storage portion 101 having therein a predetermined volume (space) capable of storing fuel, a first wiring portion or part 102, and a fuel feeding opening 103. A fuel cell body 2 includes at least an electric power generation portion 201 having a membrane electrode assembly (MEA), a fuel receiving opening 202 for receiving the fuel from the fuel cartridge 1 and feeding the fuel to the power generation portion 201, and a second wiring portion constituted by a contact terminal 203, an output terminal 204 for supplying generated electric power to an external equipment, and a connecting line 205.

In this embodiment, the fuel cell body 2 is a portion other than the fuel cartridge 1 of the fuel cell. The fuel cartridge 1 is mounted or loaded to (in or on) the fuel cell body 2 to function as the fuel cell. The power generation portion 201 is a structure including the MEA, a separator, etc. Here, the MEA is an integrated member prepared by joining together an electrolyte film and an electrode. More specifically, the MEA may include those prepared by not only welding the electrolytic film and the electrode through heating, pressure application, etc., but also by fixing the electrolytic film and the electrode with a fixing member, such as a screw, in a contact state therebetween. Further, the fuel cartridge in this embodiment is a fuel storing container, which is easily detachably mountable to the fuel cell body and is easily replaceable.

In the fuel cell, by mounting the fuel cartridge 1 to the fuel cell body 2 including the power generation portion 201, the first wiring portion 102 contacts the contact terminal 203 as a part of the second wiring portion. As a result, a wiring connecting the power generation portion 201 and the output terminal 204 is formed. More specifically, a portion consisting of the power generation portion 201, one contact terminal 203, and the connecting line 205 connecting the power generation portion 201 and the contact terminal 203 and a portion consisting of the output terminal 204, the other contact terminal 203, and the connecting line connecting these terminals 204 and 203 are electrically connected.

In this manner, when the fuel cartridge 1 is mounted to the fuel cell body 2 to be placed in a state in which fuel is feedable from the fuel cartridge 1 to the fuel cell body 2, the output terminal 204 of the fuel cell body 2 and the power generation portion 201 are electrically connected to each other to create a state in which electric power can be supplied from the fuel cell (FIG. 2). Herein, the "state in which fuel is feedable from the fuel cartridge 1 to the fuel cell body 2" means a state in which fuel is capable of being fed from the fuel cartridge 1 to the fuel cell body 2, thus being not limited to a state in which the fuel is actually fed from the fuel cartridge 1 to the fuel cell body 2. In other words, this state includes both a situation in which the fuel cartridge 1 is properly mounted to the fuel cell body 2 and the fuel is actually being fed and a situation in which the fuel cartridge 1 is properly mounted to the fuel cell body 2, but the fuel is not being fed.

Further, the electrically connected state is held by removing the fuel cartridge 1 from the fuel cell body 2. Herein, "removing the fuel cartridge 1 from the fuel cell body 2" means not only a case where the fuel cartridge 1 is completely separated spatially from the fuel cell body 2, but also a case where the fuel cartridge 1 is not completely separated spatially from the fuel cell body 2, as shown in FIG. 1. In other words, the latter case is where the fuel cartridge 1 and the fuel cell body 2 are not completely separated although the fuel feeding opening 103 and the fuel receiving opening 202 are completely separated. In this case, the fuel cartridge 1 and the fuel cell body 2 may also be connected at portions other than the fuel feeding opening 103 and the fuel receiving opening 202.

The fuel cartridge 1 used in the present invention contains fuel for the fuel cell inside the fuel storage portion.

The fuel usable in the present invention is not particularly limited and may be gaseous or liquid. Gaseous fuel preferably includes hydrogen gas as the main component. In the case where the gaseous fuel principally including hydrogen gas is stored, the fuel storage portion 101 preferably contains therein a hydrogen-storing alloy as desired. Further, as liquid fuel, a liquid principally including alcohol, particularly an aqueous alcohol solution, is preferably used. Examples of the aqueous alcohol solution include an aqueous methanol solution and an aqueous ethanol solution. The aqueous methanol solution is preferred.

A material for a wall member of the fuel storage portion of the fuel cartridge 1 can be constituted by an electroconductive material, such as a metal or an alloy, or an electrically insulating material, such as a resin. The wall member may also be prepared by molding the electroconductive material and coating at least one of its inner and outer surfaces with the electrically insulating material. Further, in the case of using the liquid fuel, the wall member material for the fuel storage portion is preferably resistant to the liquid fuel. For example, as the wall member material for the fuel storage portion suitable for the aqueous methanol solution, it is possible to use polyethylene, polypropylene, polyethylene terephthalate, polyacrylnitrile, polyethylene naphthalate, etc. In the case of storing the aqueous ethanol solution, in addition to these polymers (resins), it is possible to preferably use a polyamide, a polyacetal, an acrylonitrile butadiene styrene resin (copolymer), etc.

Further, in the case where the fuel is a gas, an internal pressure of the fuel storage portion 101 is preferably higher than atmospheric pressure. This is because the fuel is smoothly injected from the fuel cartridge 1 including the fuel storage portion 101 into the polymer electrolyte fuel cell body 2 when the internal pressure of the fuel storage portion 101 is higher than atmospheric pressure.

Further, the fuel storage portion 101 may also be provided with a portion in which waste fuel is stored.

The fuel stored in the fuel storage portion 101 is fed to the fuel cell body 2 through the fuel feeding opening 103 located at the surface of the fuel cartridge 1. The fuel feeding opening 103 may preferably be provided with a valve having such a structure that the valve is in an open state when the fuel cartridge 1 is mounted to the fuel cell body 2 and is in a closed state when the fuel cartridge 1 is not mounted to the fuel cell body 2.

Figure 7:
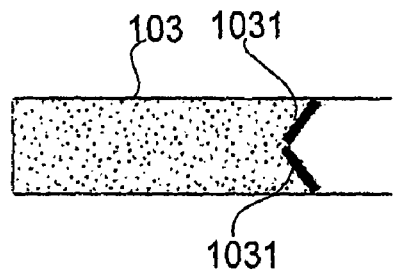
FIG. 7 is a schematic sectional view showing an embodiment of a fuel feeding opening provided to a fuel cartridge in an unmounted state of the fuel cartridge used in the present invention to a fuel cell body.
Figure 8:
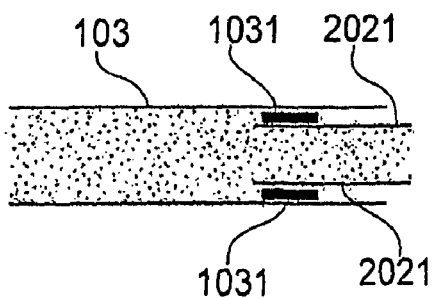
FIG. 8 is a schematic sectional view showing an embodiment of a fuel feeding opening provided to a fuel cartridge and a pipe of a receiving opening provided to a fuel cell body in a mounted state of the fuel cartridge used in the present invention to the fuel cell body.

The structure of such a valve is shown in FIG. 7 or 8. FIG. 7 is a sectional view of the fuel feeding opening 103 provided to the fuel cartridge in an unmounted state of the fuel cartridge to the fuel cell body in this embodiment. FIG. 8 is a sectional view of the fuel feeding opening 103 provided to the fuel cartridge in a mounted state of the fuel cartridge to the fuel cell body. A valve 1031 provided to the fuel feeding opening 103 is, as shown in FIG. 8, opened by mounting the fuel cartridge 1 to the fuel cell body 2 to push a pipe or tube 2021 provided to the fuel receiving opening 202 into the fuel feeding opening 103. The shape of the pipe 2021 of the fuel receiving opening 202 is not limited to a pipe-like shape so long as it can open the valve 1031 and does not block the feeding of fuel. Further, in a state in which the fuel feeding opening 103 is not mounted to the fuel receiving opening 202, as shown in FIG. 7, the valve 1031 is placed in the closed state, thus preventing the fuel from flowing out.

In the present invention, the power generation portion may also be of a type wherein hydrogen gas is directly supplied to the power generation portion and is reacted with oxygen taken in from outside air at the power generation portion, or of a so-called methanol direct type in which methanol is directly supplied to an oxidation anode instead of hydrogen gas. Further, the power generation portion may preferably be of a solid polymer-type using an ion-exchange polymeric membrane as an electrolyte.

In the present invention, the first wiring portion may have any shape, such as circular shape, dot shape, line shape, ring shape, or combinations of these shapes. At least a part of the first wiring portion is exposed at a surface of the fuel cartridge. A position where the first wiring portion is disposed is not limited to those shown in FIGS. 1 and 2 in this embodiment and may be any position capable of electrically connecting a pair of contact terminals 203 to each other. Further, as shown in FIGS. 1 and 2, it is not required for the entire surface of the first wiring portion to be exposed at the surface of the fuel cartridge. Herein, the expression "exposed at the surface of the fuel cartridge" may include not only a case where at least a part of the first wiring portion is always exposed at an outermost surface of the fuel cartridge, but also a case where at least a part of the first wiring portion is exposed at the surface of the fuel cartridge as desired, specifically only in the case of mounting the fuel cartridge to the fuel cell body. For example, the expression may include a case where the first wiring portion is capable of being exposed at the outermost surface of the fuel cartridge depending on a mounting operation of the fuel cartridge, such as a case where a protective member, such as a movable cover (lid), is attached in the neighborhood of the first wiring portion 2. In this manner, the movable cover is provided in the neighborhood of the first wiring portion 2 to prevent
damage to the first wiring portion.

The first wiring portion shown in FIG. 1 constitutes a part of the wiring for supplying generated current only when the fuel cartridge 1 is properly mounted to the fuel cell body 2. The first wiring portion may preferably have a low electric resistance, specifically a sheet resistance of $10^3$ ohm/sq or less. Materials for forming the first wiring portion include metals, such as gold, gold-plated metal, aluminum, copper, iron, nickel, and platinum; alloy, such as stainless steel; and electroconductive materials, such as electroconductive carbon, electroconductive ceramics, and electroconductive polymers. A method of forming such a first wiring portion is not particularly limited. For example, the first wiring portion may be formed by any method including a liquid-phase method, such as application of a paste, a vapor-phase deposition method, such as vapor deposition or sputtering, adhesion of an electroconductive tape, etc. It is also possible to form the first wiring portion by forming an electroconductive material, such as a metal, on the surface of the fuel cartridge and then covering a portion other than the first wiring portion with an electrically insulating material.

At the surface of the fuel cartridge 1, the portion other than the portion where the first wiring portion is exposed is preferably electrically insulative. Such an electrically insulating surface portion of the fuel cartridge 1 preferably has a sheet resistance of $10^8$ ohm/sq or more, more preferably $10^{13}$ ohm/sq or more. The portion other than the first wiring portion 102 is made electrically insulative, so that it is also possible to prevent the energizing when the fuel cartridge 1 is improperly mounted to the fuel cell body 2. Accordingly, the portion other than the first wiring portion 102 or a portion of the first wiring portion 102 exposed at the surface of the fuel cartridge 1 preferably has a minimal size.

Figure 6:
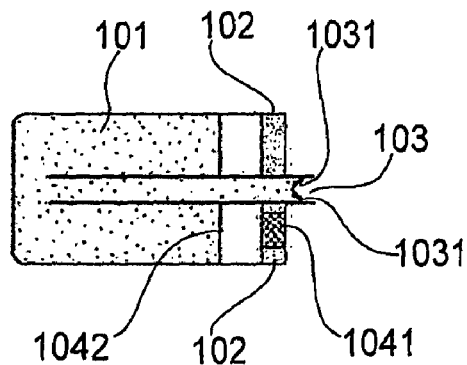
FIG. 6 is a schematic sectional view showing an embodiment of a fuel cartridge used in the present invention.

In the present invention, movement of the fuel from the fuel cartridge 1 to the polymer electrolyte fuel cell body 2 is preferably actively effected. In order to ensure the active movement of the fuel, the fuel cartridge 1 is preferably provided with a fuel feeding mechanism, such as a pump, actuated by electric power supplied through the first wiring portion. Incidentally, even in the case where the fuel cartridge is not in a pressurized state and there is no fuel feeding mechanism, feeding of the fuel is effected, so that the fuel is placed in the feedable state. However, by providing the fuel feeding mechanism, it is possible to promote the feeding of the fuel. An example of the fuel feeding mechanism of the fuel cartridge is shown in FIG. 6, wherein the fuel feeding mechanism is constituted by a pump 1041 and a movable partition wall 1042. The pump 1041 is electrically connected to the first wiring portion 102 at a connection portion. When electric power is supplied from the connection portion, the pump 1041 supplies outside air from an inlet port (not shown) into the fuel cartridge. The movable partition wall 1042 partitions an inner space of the fuel cartridge into the fuel storage portion 101 and a hollow portion for storing outside air supplied to the pump 1041 and has a structure movable in the fuel cartridge. For this reason, when the pump 1041 takes in outside air, the fuel is fed by the movement of the movable partition wall 1042.

Further, in the case where the fuel is a gas, by creating the pressurized state with an inert gas, such as nitrogen, it is possible to effect the fuel movement actively even if there is no fuel feeding mechanism.

An operation mechanism from the mounting of the fuel cartridge to the electric power generation is as follows.

By connecting the fuel feeding opening 103 and the fuel receiving opening 202, the fuel is fed from the fuel storage portion 101 to the anode of the MEA of the power generation portion 201 to start the generation of electric power in the MEA. At the same time, by contact of the contact terminal 203 with the first wiring portion 102, i.e., contact between the first and second wiring portions, an interconnecting line connecting the power generation portion 201 with the output terminal 204 is formed. The first wiring portion 102 functions as a part of the interconnecting line. Conversely, when the fuel cartridge 1 is removed from the polymer electrolyte fuel cell body 2, the contact terminal 203 and the first wiring portion 102 are placed in a noncontact state to disconnect the interconnecting line. As a result, the electric power cannot be supplied from the output terminal 204.

Further, in the above-described constitution, the feeding of oxygen fuel to the cathode of the fuel cell body 2 is effected by utilizing outside air, but in the present invention, the oxygen fuel may also be fed form a fuel cartridge, as shown in FIGS. 1 and 2.

More specifically, a state in which the fuel is fed to the power generation portion to generate electric power, as shown in FIGS. 1 and 2, is deemed to be a normal "on" state. A switch for establishing this state is constituted by the first wiring portion 102 and the pair of connection terminals 203. In this manner, it is possible to provide a fuel cell and fuel cartridge that have an inexpensive and simple constitution capable of synchronizing mounting/demounting of the fuel cartridge with the ON/OFF state of the current.

Embodiment 2

Figure 3:
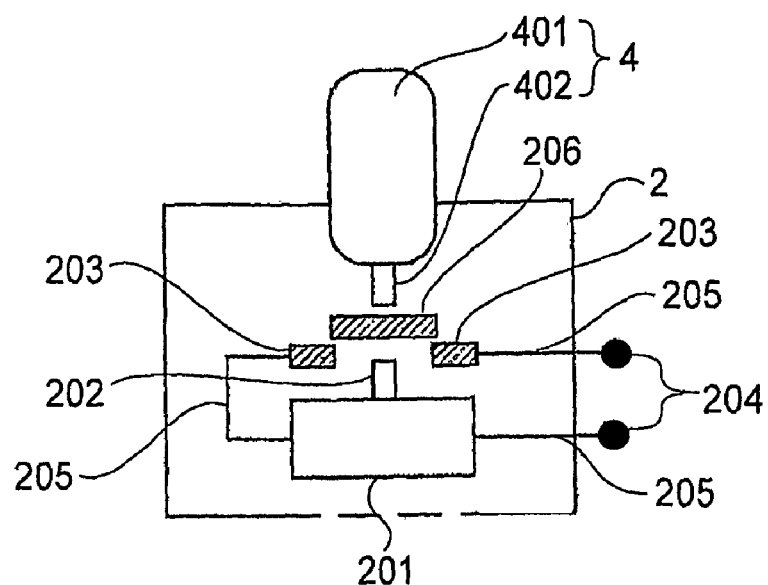
FIG. 3 is a schematic view showing an unmounted state of a fuel cartridge to a fuel cell body in Embodiment 2 of the present invention.
Figure 4:
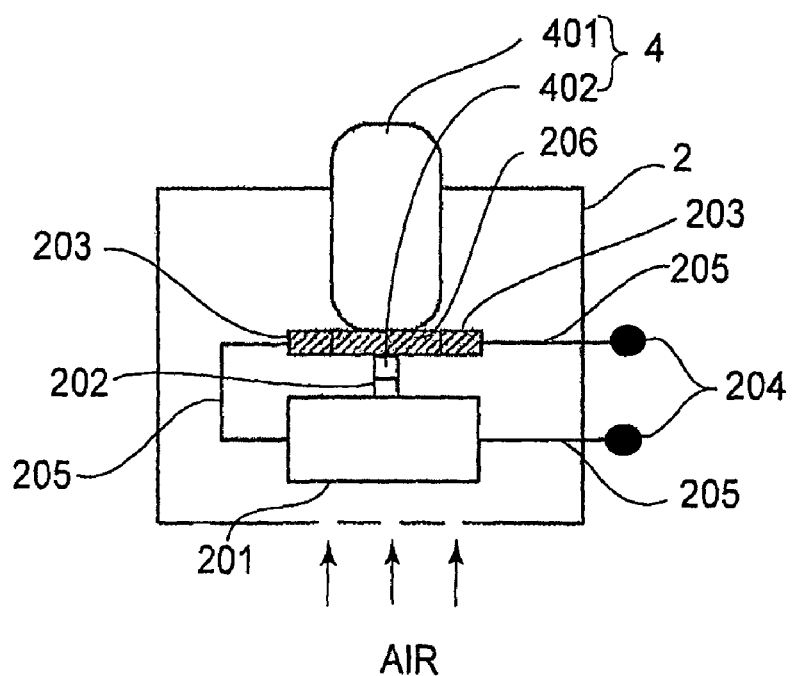
FIG. 4 is a schematic view showing a mounted state of a fuel cartridge to a fuel cell body in Embodiment 2 of the present invention.

FIGS. 3 and 4 show a fuel cell according to another embodiment of the present invention. FIG. 3 is a schematic view showing a state in which a fuel cartridge is not mounted to a fuel cell body. FIG. 4 is a schematic view showing the fuel cartridge mounted to the fuel cell body.

Figure 11:
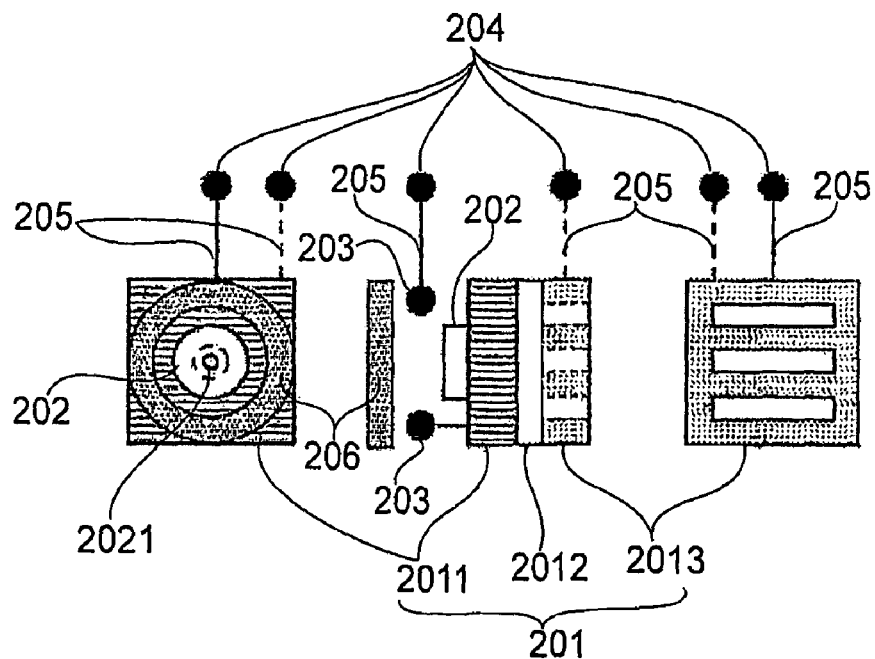
FIG. 11 is a schematic view showing an embodiment of a polymer electrolyte fuel cell body in Embodiment 5 of the present invention.

This embodiment is different from Embodiment 1 in that a first wiring portion 206 is not integrally provided to a fuel cartridge 4, but is provided to a fuel cell body 2 and is moved depending on mounting and demounting of the fuel cartridge 4. The first wiring portion 206 is formed of a platinum foil cut in a doughnut-like shape, as shown in FIG. 11, and is provided to a housing member via a plate spring (not shown) on the fuel cell body 2 side, not on the fuel cartridge 4 side.

When the fuel cartridge 4 is mounted to the fuel cell body 2, as shown in FIG. 4, a fuel feeding opening 402 is connected to a fuel receiving opening 202. At the same time, the first wiring portion 206 is pushed downward by the fuel cartridge 4 and moved to contact a pair of contact terminals 203. In other words, the first wiring portion 206 and a second wiring portion (including the contact terminals 203, a power generation portion 201, and a connecting line 205) contact each other. As a result, a wiring is created in the fuel cell to ensure a state capable of supplying electric power from output terminals 204.

Further, in the case where the fuel cartridge 4 is removed or demounted from the fuel cell body 2, the first wiring portion 206 is returned to an original position by being moved up by a spring mechanism or the like. In other words, the wiring is disconnected by a noncontact between the first wiring portion 206 and the contact terminals 203, so that the supply of electric power from the output terminals 204 cannot be effected.

More specifically, when a state in which the fuel is fed to the power generation portion to generate electric power, as shown in FIGS. 3 and 4, is deemed to be a normal "on" state, a switch for establishing this state is constituted by the first wiring portion 206 and the pair of connection terminals 203. In this manner, it is possible to provide a fuel cell and fuel cartridge that have an inexpensive and simple constitution capable of synchronizing mounting/demounting of the fuel cartridge with an ON/OFF state of the current.

Embodiment 3

Figure 5:
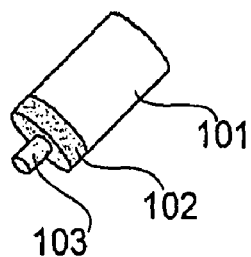
FIG. 5 is a schematic perspective view showing an embodiment of a fuel cartridge used in the present invention.

FIGS. 5 and 6 show a constitution of a fuel cartridge according to this embodiment of the present invention. FIG. 5 is a perspective view showing the fuel cartridge of this embodiment. FIG. 6 is a sectional view of the fuel cartridge.

In this embodiment, a fuel storage portion 101 is formed of propylene, which is electrically insulative. In the fuel storage portion 101, e.g., a 10 wt. %-aqueous methanol solution is stored. The first wiring portion 102 is formed of a platinum foil cut in a doughnut-like shape and is affixed as a surface layer of the fuel cartridge 101. A fuel feeding opening 103 is prepared by using a commercially available resinous tube joint, one end portion of which is located inside the fuel storage portion 101 and the other end portion is provided therein with a valve 1031 that cannot be opened until the fuel feeding opening 103 is connected to a connector having a shape corresponding to that of the fuel feeding opening 103, similar to Embodiment 1, described with reference to FIG. 6.

Further, in this embodiment, as shown in FIG. 6, the air supply pump 1041, the movable partition wall 1042, and the inlet port (not shown) have the same structures as those in Embodiment 1.

Embodiment 4

Figure 9:
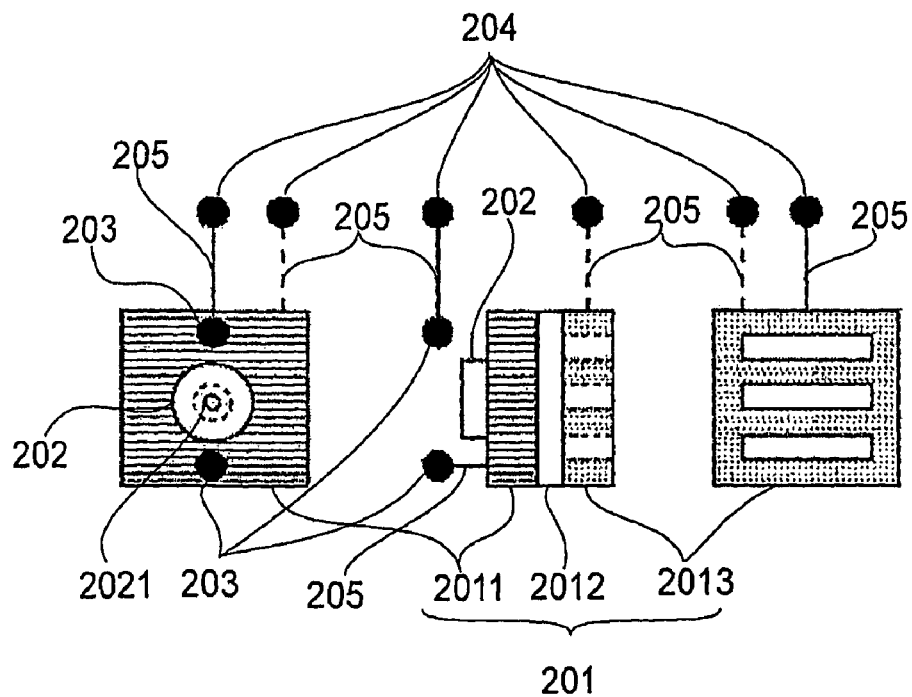
FIG. 9 is a schematic view showing an embodiment of a polymer electrolyte fuel cell body in Embodiment 4 of the present invention.

FIG. 9 is a schematic view for illustrating a constitution of a polymer electrolyte fuel cell body according to this embodiment of the present invention, wherein a left section is a plan view when the fuel cell body is viewed from a fuel receiving opening side, a central section is a sectional view, and a right section is a plan view when the fuel cell body is viewed from a cathode diffusion layer side.

A power generation portion 201 having an MEA is constituted by an anode diffusion layer 2011, a solid polymer electrolytic membrane 2012, and a cathode diffusion layer 2013. The anode diffusion layer 2011 and the cathode diffusion layer 2013 are formed of electroconductive carbon and also function as electrodes. The cathode diffusion layer 2013 is provided with slits for externally taking in air. Further, a catalyst layer (not shown) for accelerating the decomposition of the fuel is provided at each of interfaces between the anode diffusion layer 2011 and the solid polymer electrolytic membrane 2012 and between the solid polymer electrolytic membrane 2012 and the cathode diffusion layer 2013.

The fuel receiving opening 202 is prepared by cutting a commercially available resinous tube. At one end portion, the fuel receiving opening 202 is connected to a diffusion structure portion of the anode diffusion layer 2011. At the other end portion, the fuel receiving opening 202 has a double structure, such that a pipe or tube 2021 is provided therein. When the fuel receiving opening 202 is connected with the fuel feeding opening 103 of the fuel cartridge in the above-described embodiments, the pipe 2021 is inserted into the fuel feeding opening 103 to open the valve 1031.

Contact terminals 203 are provided at two positions where they contact the first wiring portion 102 during the mounting of the fuel cartridge 1. One of the contact terminals 203 is electrically connected to the anode diffusion layer 2011 via a copper interconnecting line 205 as a connecting line and the other contact terminal 203 is electrically connected to one of output terminals 204 via a copper interconnecting line 205. The other output terminal 204 is electrically connected to the cathode diffusion layer 2013 via a copper interconnecting line 205.

Further, in this embodiment, it is possible to employ the same constitution of the fuel cartridge as that shown in FIGS. 5 and 6.

Figure 10:
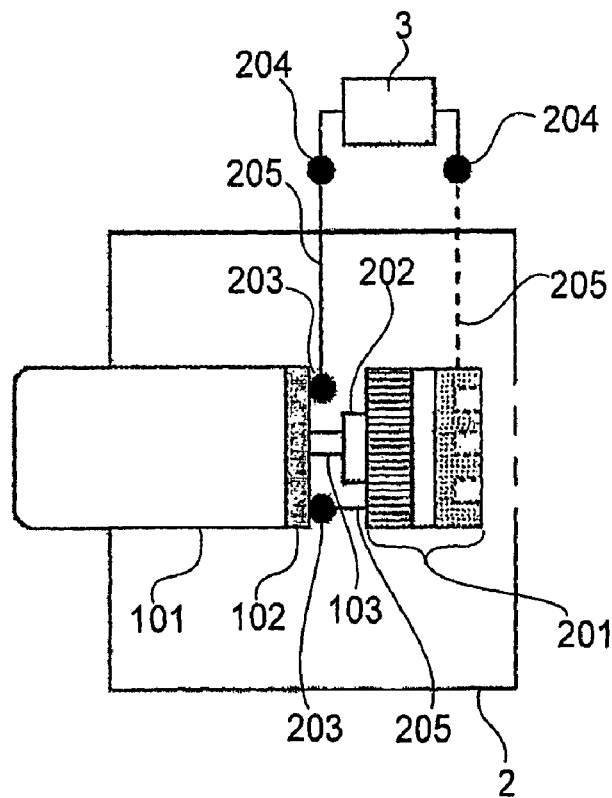
FIG. 10 is a schematic view showing a mounted state of a fuel cartridge to a fuel cell body in Embodiment 4 of the present invention.

FIG. 10 shows a state in which the fuel cartridge in Embodiment 3 is mounted to the polymer electrolyte fuel cell body 2 shown in FIG. 9 to prepare a polymer electrolyte fuel cell.

As shown in FIG. 10, in this embodiment, external equipment 3, such as an electric tester, is provided. When the fuel feeding opening 103 and the fuel receiving opening 102 are properly connected, the valve is opened to feed methanol fuel to the MEA in the power generation portion 201. At the same time, generation of electric power is started by contact of the first wiring portion 102 with the two contact terminals 203, thus also actuating the air supply pump of the fuel cartridge. An average electric power of 0.5 V and 0.2 A, i.e., an output of 0.1 W, can be confirmed by the electric tester. After a stable operation for 30 minutes, when the fuel cartridge is removed, the circuit is immediately disconnected. As a result, the output (power) detected by the electric tester is 0 W.

Embodiment 5

Figure 12:
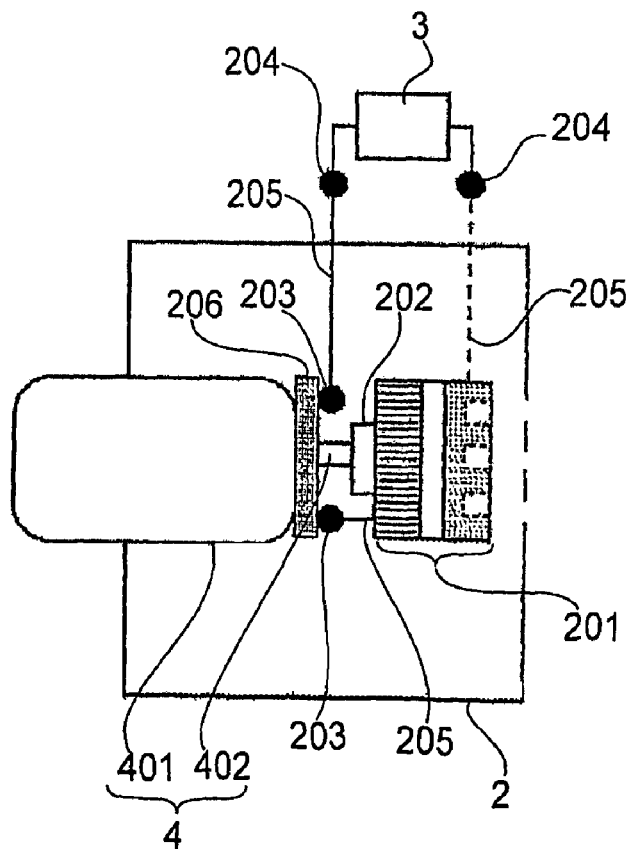
FIG. 12 is a schematic view showing a mounted state of a fuel cartridge to a fuel cell body in Embodiment 5 of the present invention.

FIG. 11 is a schematic view for illustrating a constitution of a polymer electrolyte fuel cell body according to this embodiment. FIG. 12 is a schematic view showing a constitution of a fuel cell of this embodiment in which a fuel cartridge is mounted to the fuel cell body.

This embodiment is different from Embodiment 4 in that a movable first wiring portion 206 formed of a copper plate (sheet) having a doughnut-like shape is provided to a housing member via a plate spring (not shown) on the fuel cell body 2 side, not on the fuel cartridge 4 side.

Referring to FIG. 12, the fuel cartridge 4 is mounted to the polymer electrolyte fuel cell body 2 to be actuated as a fuel cell. The first wiring portion 206 is pushed by the mount of the fuel cartridge 4 toward the side of the power generation portion 201 having the MEA to contact the contact terminals 203. When a fuel feeding opening 402 and the fuel receiving opening 202 are properly connected, the valve is opened in a manner similar to that in the above-described embodiments. As a result, methanol fuel is fed from a fuel storage portion 401 to the power generation portion 201 having the MEA to start the generation of electric power. When electric power outputted from the output terminals 204 is measured by the electric tester 3, it is possible to confirm the average electric power of 0.5 V and 0.16 A, i.e., an output (power) of 0.08 W. After a stable operation for 30 minutes, when the fuel cartridge 4 is removed, the circuit is immediately disconnected. As a result, the output detected by the electric tester is 0 W.

Incidentally, in this embodiment, the wiring may be established by mounting the fuel cartridge to the fuel cell body to move the movable first wiring portion. Accordingly, the movement of the first wiring portion may be effected by moving the first wiring portion by the fuel cartridge not only directly, but also indirectly. For example, by mounting the fuel cartridge to the fuel cell body to actuate a member, such as a lever (utilizing leverage), the first wiring portion may also be moved.

INDUSTRIAL APPLICABILITY

As described hereinabove, according to the present invention, there are provided a fuel cell and fuel cartridge that are capable of synchronizing mounting and demounting of the fuel cartridge with a transition between a supply state and a supply-interrupting state of the current produced by electric power generation by means of an electric circuit having a simple constitution.

While the invention has been described with reference to the structures disclosed herein, it is not limited. This application is intended to cover such modifications or changes as may come within the purpose of the improvements or the scope of the following claims.

The invention claimed is:

1. A fuel cell comprising:
a fuel cartridge comprising a fuel storage portion, a first wiring portion, and a fuel feed opening; and
a fuel cell body comprising a first output terminal, a second output terminal, a second wiring portion, a third wiring portion, and a power generation portion, the power generation portion having an anode and a cathode,
wherein the first output terminal is electrically connected to the second wiring portion, the second output terminal is electrically connected to the cathode, and the third wiring portion is electrically connected to the anode,
wherein the first output terminal and the second output terminal are constructed so as to be capable of supplying generated electric power to an external equipment,
wherein the first wiring portion, the second wiring portion and the third wiring portion are constructed to electrically connect to each other to establish an electrical connection between the first output terminal and the anode when said fuel cartridge is mounted to said fuel cell body to place a fuel in a state in which the fuel is feedable from said fuel cartridge to said fuel cell body, and
wherein the first wiring portion, the second wiring portion and the third wiring portion are constructed to electrically disconnect from each other when said fuel cartridge is demounted from said fuel cell body, such that the first output terminal and the anode are electrically disconnected.

2. A cell according to claim 1, wherein said fuel cell is a polymer electrolyte fuel cell.

3. A fuel cartridge comprising:
a fuel storage portion;
a first wiring portion; and
a fuel feed opening,
wherein said fuel feed opening is constructed to mount to a fuel cell body to place a fuel in a state in which the fuel is feedable from said fuel cartridge to said fuel cell body,
wherein the fuel cell body includes a first output terminal, a second output terminal, a second wiring portion, a third wiring portion, and a power generation portion, the power generation portion having an anode and a cathode,
wherein the first output terminal is electrically connected to the second wiring portion, the second output terminal is electrically connected to the cathode, and the third wiring portion is electrically connected to the anode,
wherein the first output terminal and the second output terminal are constructed so as to be capable of supplying generated electric power to an external equipment,
wherein the first wiring portion of the fuel cartridge is constructed to electrically connect to the second wiring portion and the third wiring portion of the fuel cell body to establish an electrical connection between the first output terminal and the anode when said fuel cartridge is mounted to said fuel cell body to place a fuel in a state in which the fuel is feedable from said fuel cartridge to said fuel cell body, and
wherein the first wiring portion of the fuel cartridge is constructed to electrically disconnect from the second wiring portion and the third wiring portion of the fuel cell body when said fuel cartridge is demounted from said fuel cell body, such that the first output terminal and the anode are electrically disconnected.

4. A cell according to claim 1, wherein a positional relationship between the power generation portion and the first and second output terminals does not change when said cartridge is mounted or demounted.

5. A cartridge according to claim 3, wherein a positional relationship between the power generation portion and the first and second output terminals does not change when said cartridge is mounted or demounted.

6. A cartridge according to claim 3, wherein at least a part of said first wiring portion is exposed at a surface of said fuel cartridge, and the surface of said fuel cartridge is electrically insulative at a portion thereof other than the exposed portion.

7. A cartridge according to claim 3, further comprising a fuel feeding mechanism driven by electric power supplied through said first wiring portion.

8. A cartridge according to claim 3, further comprising a valve having a structure which is opened when said fuel cartridge is mounted in the fuel cell body and is closed when said fuel cartridge is demounted from the fuel cell body.

9. A fuel cell comprising:
a fuel cartridge according to claim 3; and
a fuel cell body comprising an output terminal and a power generation portion.

* * * * *